(12) United States Patent
Rittenhouse

(10) Patent No.: US 9,500,200 B2
(45) Date of Patent: Nov. 22, 2016

(54) SYSTEMS AND METHODS FOR DETECTING THE ONSET OF COMPRESSOR STALL

(75) Inventor: Brian Allen Rittenhouse, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1059 days.

(21) Appl. No.: 13/450,833

(22) Filed: Apr. 19, 2012

(65) Prior Publication Data

US 2013/0276425 A1 Oct. 24, 2013

(51) Int. Cl.
*F02C 9/20* (2006.01)
*F04D 27/02* (2006.01)
*F04D 29/56* (2006.01)
*F04D 27/00* (2006.01)

(52) U.S. Cl.
CPC .......... *F04D 27/0246* (2013.01); *F02C 9/20* (2013.01); *F04D 27/001* (2013.01); *F04D 29/563* (2013.01); *F05D 2270/101* (2013.01)

(58) Field of Classification Search
CPC ...... F02C 9/20; F02C 9/54; F05D 2270/101; F04D 27/0246; F04D 27/001; F04D 29/563
See application file for complete search history.

(56) References Cited

U.S. PATENT DOCUMENTS

| | | | | |
|---|---|---|---|---|
| 2,850,226 A * | 9/1958 | Lundquist | ................. | F02C 9/20 415/147 |
| 2,999,630 A * | 9/1961 | Warren | ................. | F01D 17/162 415/149.4 |
| 3,344,606 A * | 10/1967 | Abernethy | ................. | F02C 9/18 60/241 |
| 3,502,260 A * | 3/1970 | Koff | .............................. | 415/148 |
| 3,799,689 A * | 3/1974 | Moriguti | ............... | F01D 17/165 415/151 |
| 4,196,472 A * | 4/1980 | Ludwig | ................. | F04D 27/001 340/966 |
| 4,279,568 A * | 7/1981 | Munroe | ..................... | F02C 9/20 415/17 |
| 4,581,888 A | 4/1986 | Schmitzer et al. | | |
| 4,967,550 A * | 11/1990 | Acton | ...................... | F01D 25/06 415/119 |
| 4,978,280 A * | 12/1990 | Tubbs | .................... | F04D 29/563 415/159 |
| 5,005,353 A * | 4/1991 | Acton | ...................... | F01D 17/02 415/119 |
| 5,082,421 A * | 1/1992 | Acton | ...................... | F01D 17/02 415/118 |
| 5,141,391 A * | 8/1992 | Acton | ...................... | F01D 17/02 381/71.7 |
| 5,586,857 A * | 12/1996 | Ishii | ......................... | F04D 27/02 415/13 |
| 5,993,152 A * | 11/1999 | Schilling | ....................... | 415/160 |
| 6,582,183 B2 * | 6/2003 | Eveker | ................. | F04D 27/0207 415/1 |
| 7,065,973 B2 | 6/2006 | Rowe | | |
| 7,409,854 B2 | 8/2008 | Teolis et al. | | |
| 2004/0258520 A1* | 12/2004 | Parry | ........................ | 415/209.1 |
| 2008/0264067 A1* | 10/2008 | Flucker et al. | ................ | 60/793 |
| 2008/0273961 A1* | 11/2008 | Rosenkrans et al. | ........... | 415/13 |
| 2008/0273965 A1* | 11/2008 | Rajamani | ................ | F01D 17/02 415/129 |
| 2010/0296914 A1* | 11/2010 | Staroselsky | ........... | F04D 27/001 415/47 |
| 2011/0268554 A1* | 11/2011 | Minto | ...................... | F01D 9/041 415/1 |
| 2012/0163965 A1* | 6/2012 | Takahashi | ............. | F04D 29/544 415/199.4 |
| 2012/0269613 A1* | 10/2012 | Mills | ...................... | F01D 17/162 415/48 |

* cited by examiner

*Primary Examiner* — Carlos A Rivera
(74) *Attorney, Agent, or Firm* — Sutherland Asbill & Brennan LLP

(57) ABSTRACT

Embodiments of the present application include a stall detection system for a gas turbine engine. The system may include a compressor and a number of variable stator vanes associated with the compressor. The variable stator vanes may form one or more variable stator vane stages. The system may also include one or more resolvers associated with one or more of the variable stator vanes. The resolvers may be configured to detect a flutter in an angle of the variable stator vanes. The flutter may be indicative of the onset of compressor stall.

4 Claims, 4 Drawing Sheets

SYSTEMS AND METHODS FOR DETECTING THE ONSET OF COMPRESSOR STALL

FIELD OF THE DISCLOSURE

Embodiments of the present application relate generally to gas turbine engines and more particularly to systems and methods for detecting the onset of compressor stall.

BACKGROUND OF THE DISCLOSURE

During operation of a gas turbine engine using a multistage axial compressor, a turbine rotor is turned at high speeds by a turbine so that air is continuously induced into the compressor. The air is accelerated by rotating blades and swept rearwards onto adjacent rows of variable stator vanes. Each rotor blade/variable stator vane stage increases the pressure of the air.

In addition to translating the kinetic energy of the air into pressure, the variable stator vanes also serve to correct the deflection given to the air by the rotor blades and to present the air at the correct angle to the next stage of rotor blades. Pivoting the variable stator vanes permits the flow capacity of the compressor or turbine to be changed, thereby ensuring that the flow capacity is always at an optimum value for the particular operating conditions of the gas turbine engine.

The operating efficiency of the gas turbine may be improved by operating the compressor at a relatively high pressure ratio. However, if the pressure ratio is allowed to exceed a certain critical value during turbine operation, an undesirable condition known as compressor stall may occur. Compressor stall may reduce the compressor pressure ratio and reduce the airflow delivered to a combustor, thereby adversely affecting the efficiency of the gas turbine. Rotating stall in an axial-type compressor typically occurs at a desired peak performance operating point of the compressor. Following rotating stall, the compressor may transition into a surge condition or a deep stall condition that may result in a loss of efficiency and, if allowed to be prolonged, may lead to catastrophic failure of the gas turbine. Accordingly, there is a need to detect and prevent compressor stall.

BRIEF DESCRIPTION OF THE DISCLOSURE

Some or all of the above needs and/or problems may be addressed by certain embodiments of the present application. According to one embodiment, there is disclosed a stall detection system for a gas turbine engine. The system may include a number of variable stator vanes. The variable stator vanes may form one or more variable stator vane stages. The system may also include one or more resolvers associated with one or more of the variable stator vanes. The resolvers may be configured to detect a flutter in an angle of the variable stator vanes. The flutter may be indicative of the onset of compressor stall.

According to another embodiment, there is disclosed a stall detection method for a gas turbine engine. The method may include associating one or more resolvers with one or more variable stator vanes. The method may also include detecting a flutter in an angle of the variable stator vanes. The flutter may be indicative of the onset of compressor stall.

Further, according to another embodiment, there is disclosed a stall detection system for a gas turbine engine. The system may include a compressor and a number of variable stator vanes associated with the compressor. The variable stator vanes may form one or more variable stator vane stages. The system may also include one or more resolvers associated with one or more of the variable stator vanes. The resolvers may be configured to detect a flutter in an angle of the variable stator vanes. The flutter may be indicative of the onset of compressor stall.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE DISCLOSURE

Illustrative embodiments will now be described more fully hereinafter with reference to the accompanying drawings, in which some, but not all embodiments are shown. The present application may be embodied in many different forms and should not be construed as limited to the embodiments set forth herein. Like numbers refer to like elements throughout.

Figure 1:
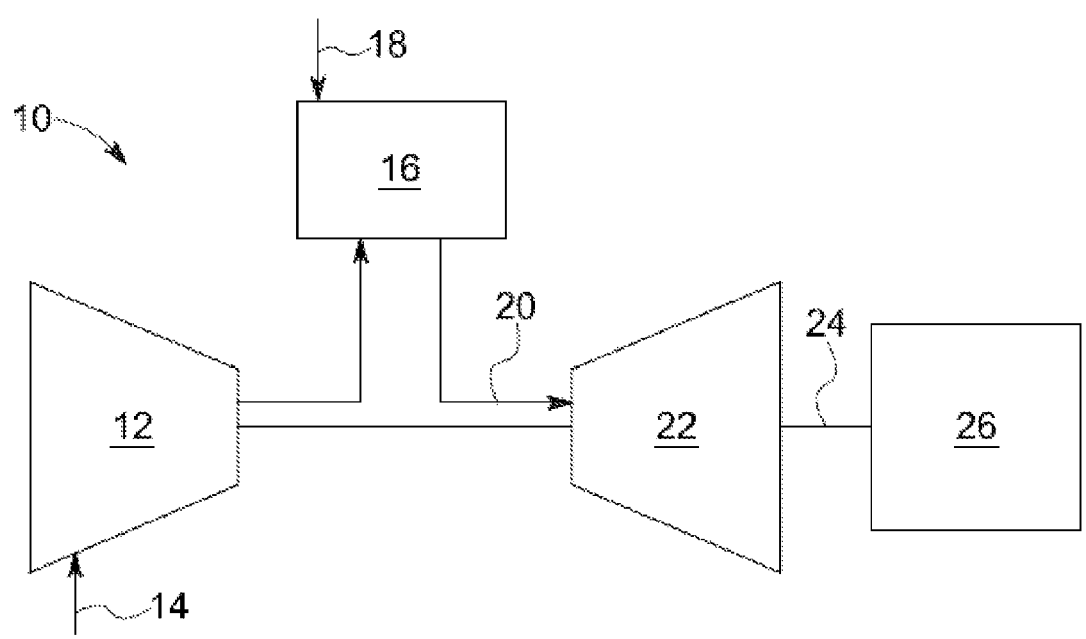
FIG. 1 is a schematic of an example diagram of a gas turbine engine with a compressor, a combustor, and a turbine, according to an embodiment.

Illustrative embodiments are directed to, among other things, systems and methods for detecting compressor stall in gas turbine engines. FIG. 1 shows an example schematic view of a gas turbine engine 10 as may be used herein. As is known, the gas turbine engine 10 may include a compressor 12. The compressor 12 compresses an incoming flow of air 14. The compressor 12 delivers the compressed flow of air 14 to a combustor 16. The combustor 16 mixes the compressed flow of air 14 with a pressurized flow of fuel 18 and ignites the mixture to create a flow of combustion gases 20. Although only a single combustor 16 is shown, the gas turbine engine 10 may include any number of combustors 16. The flow of combustion gases 20 is in turn delivered to a turbine 22. The flow of combustion gases 20 drives the turbine 22 so as to produce mechanical work. The mechanical work produced in the turbine 22 drives the compressor 12 via a shaft 24 and an external load 26 such as an electrical generator or the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components.

Other types of gas turbine engines also may be used herein. Multiple gas turbine engines, other types of turbines, and other types of power generation equipment also may be used herein together.

Figure 2:
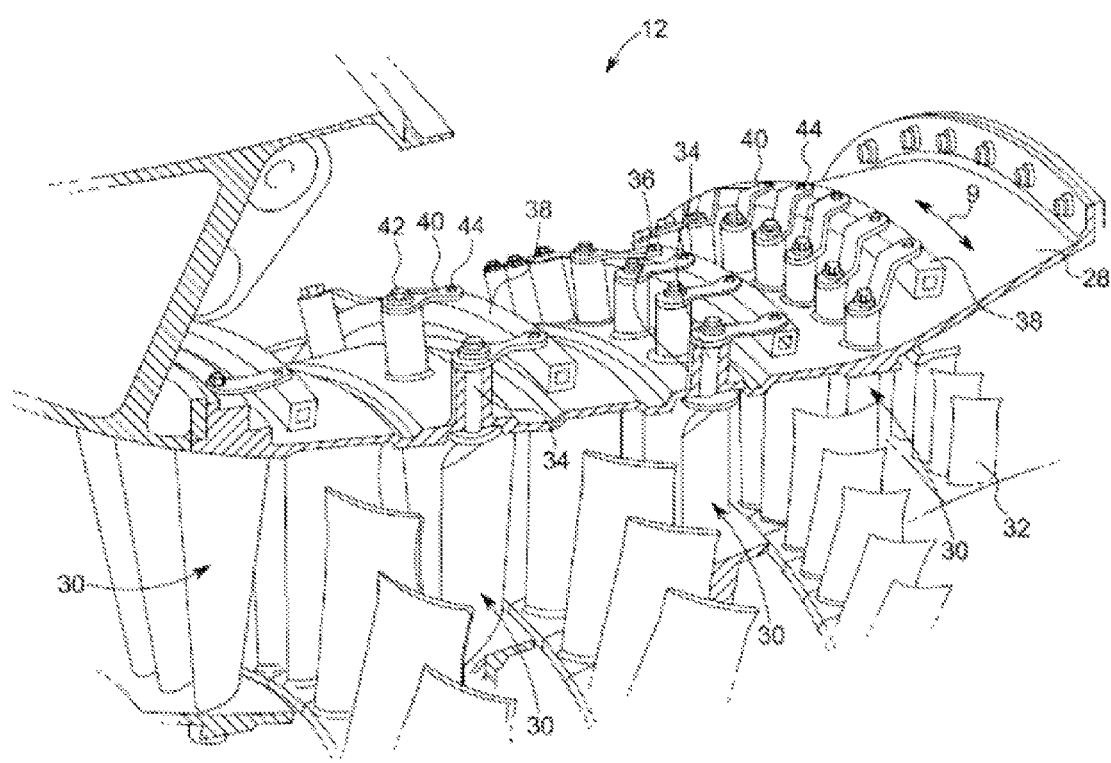
FIG. 2 is a schematic of an example portion of a compressor assembly, according to an embodiment.

FIG. 2 depicts an example section of the compressor 12 of the gas turbine engine 10 of FIG. 1. The compressor 12 may include a tubular casing 28. Sets of variable stator vanes 30 may be mounted within the casing 28 circumferentially about the central axis of the compressor 12. Corresponding sets of rotor vanes 32 may be mounted downstream of each set of variable stator vanes 30 to form various stages within the compressor 12. Each variable stator vane 30 may terminate at the casing 28 in a stem 34. The stem 34 may be rotatable in a bush bearing 36 on the outside of the casing 28.

In some instances, located externally of the casing 28 and adjacent to each set of variable stator vanes 30 are unison rings 38 extending circumferentially about the casing 28. The vane stems 34 of each set of variable stator vanes 30 may be connected to the corresponding unison ring 38 by a respective lever 40. One end of the lever 40 may be clamped to the end of the vane stem 34 by a bolt 42 so that there is no relative movement between the stem 34 and the lever 40. The other end of the lever 40 may be connected to the unison ring 38 by a pin 44 rotatable in a bush bearing located in the unison ring 38.

The unison ring 38 may be arranged so that it may be rotated about the central axis of the compressor section 12 in either direction of arrow 9. Consequently, rotation of the unison ring 38 may cause rotation of each variable stator vane 30 via the levers 40 and thus enables the variable stator vanes 30 to assume required angles of incidence to the incoming air.

Figure 3:
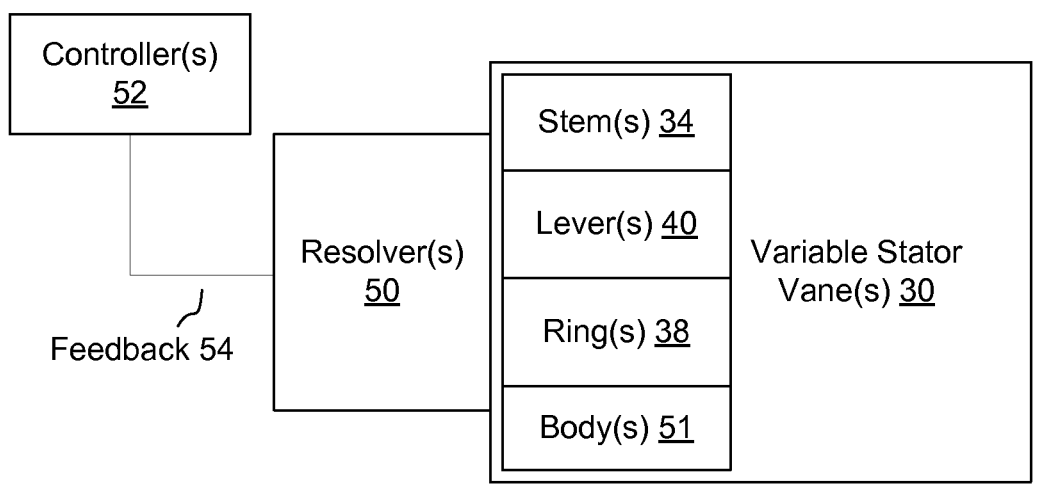
FIG. 3 is a schematic of an example diagram of a stall detection system, according to an embodiment.

As depicted in FIG. 3, a resolver 50 may be associated with the variable stator vane 30. A resolver is a type of rotary electrical transformer used for measuring degrees of rotation. That is, the resolver 50 is a type of rotary sensor. In this manner, the resolver 50 may be configured to measure the angle of the variable stator vane 30. For example, the resolver 50 may be associated with the variable stator vane 30 in any manner known in the art for measuring the angle of the variable stator vane 30. The resolver 50 may be associated with the stem 34, the lever 40, the unison ring 38, the body 51 of the variable stator vane 30, or a combination thereof to measure the angle of the variable stator vane 30. Moreover, a number of resolvers 50 may be associated with a number of variable stator vanes 30 about each of the variable stator vane stages of the compressor 12. For example, a number of resolvers 50 may be positioned symmetrically about each of the variable stator vane stages. In this manner, each resolver 50 may be associated with a particular variable stator vane 30 of the variable stator vane stages. In some instances, all of the variable stator vanes 30 may have corresponding resolvers 50; while in other instances, only some of the variable stator vanes 30 may have corresponding resolvers 50.

In certain embodiments, the resolver 50 may be in communication with a controller 52. The controller 52 may be implemented using hardware, software, or a combination thereof for performing the functions described herein. By way of example, the controller 52 may be a processor, an ASIC, a comparator, a differential module, or other hardware means. Likewise, the controller 52 may comprise software or other computer-executable instructions that may be stored in a memory and executable by a processor or other processing means.

The controller 52 may be configured to receive feedback 54 from the resolver 50. The feedback 54 may include data regarding the angle of the variable stator vane 30 and or any other movement of the variable stator vane 30. For example, the resolver 50, the feedback 54, and the controller 52 may be configured to collectively detect a flutter in an angle of the variable stator vane 30. The flutter may be indicative of the onset of a condition, such as compressor stall. Compressor stall may include rotational stall or compressor surge. As used herein, a flutter may include any movement of the variable stator vane 50, either permanent or momentary. In this manner, if the feedback 54 indicates a flutter (i.e., movement) was detected by the resolver 50, it may indicate the onset of a condition, such as rotational stall or compressor surge. For example, if the flutter (i.e., movement) of the angle of the variable stator vane 30 is beyond a predetermined threshold of movement, it may be indicative of the onset of a condition, such as rotational stall or compressor surge.

Figure 4:
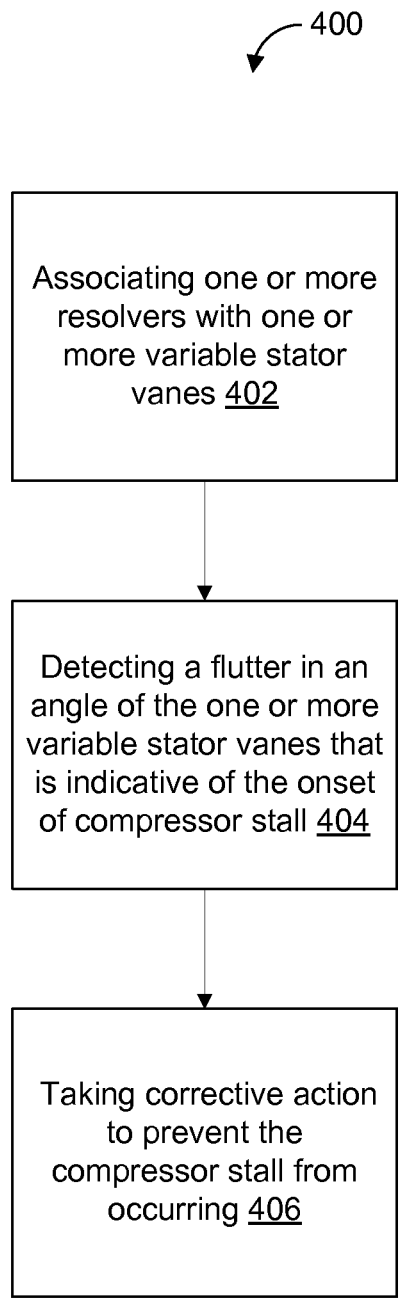
FIG. 4 is an example flow diagram of a method, according to an embodiment.

FIG. 4 illustrates an example flow diagram of a method 400 for detecting the onset of compressor stall. In this particular embodiment, the method 400 may begin at block 402 of FIG. 4 in which the method 400 may include associating one or more resolvers with one or more variable stator vanes. For example, the resolvers 50 may be associated with the variable stator vanes 30 in any manner known in the art for measuring the angle of the variable stator vane 30, including associating the resolver 50 with the stem 34, the lever 40, the unison ring 38, the body 51 of the variable stator vane 30, or a combination thereof to measure the angle of the variable stator vane 30. In certain aspects, a number of resolvers 50 may be associated with a number of variable stator vanes 30 about each of the variable stator vane stages of the compressor 12. In other aspects, a number of resolvers 50 may be positioned symmetrically about each of the variable stator vane stages. In this manner, each resolver 50 may be associated with a particular variable stator vane 30 of the variable stator vane stage. In some instances, all of the variable stator vanes 30 may have corresponding resolvers 50; while in other instances, only some of the variable stator vanes 30 may have corresponding resolvers 50.

At block 404, the method may include detecting a flutter in an angle of the one or more variable stator vanes that is indicative of the onset of compressor stall. That is, the flutter may indicate the onset of compressor stall, such as rotational stall or compressor surge. A flutter may include any movement that may be indicative of the onset of compressor stall, such as a permanent or momentary change in the angle of the variable stator vanes 30. In certain aspects, if the flutter (i.e., movement) in the angle of the variable stator vanes detected by the resolvers 50 is beyond a predetermined threshold, it may indicate the onset of compressor stall, such as rotational stall or compressor surge.

Moreover, at block 406, the method 400 may include taking corrective action to prevent the compressor stall from occurring. Such corrective action may include adjusting one or more gas turbine parameters to prevent and/or minimize the compressor stall. For example, fuel and/or airflow may be adjusted to prevent the onset of rotational stall or compressor surge. Other corrective actions may also be taken.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A stall detection method for a gas turbine engine, comprising:
    associating one or more resolvers with one or more variable stator vanes, wherein the one or more resolvers comprise one or more rotary sensors;
    receiving feedback from the one or more resolvers comprising data regarding an angle of the one or more variable stator vanes and relative movement of the one or more variable stator vanes with respect to the angle;

receiving feedback from the one or more resolvers comprising data regarding an angle of the one or more variable stator vanes and; and detecting, by the one or more resolvers, a flutter comprising the relative movement in the the angle of the one or more variable stator vanes that is indicative of an onset of a compressor stall.

2. The method of claim 1, further comprising taking corrective action to prevent the compressor stall from occurring.

3. The method of claim 1, further comprising positioning the one or more resolvers symmetrically about one or more variable stator vane stages.

4. The method of claim 1, further comprising determining whether the flutter meets a predetermined threshold indicative of the onset of compressor stall.

* * * * *